United States Patent [19]

Channin

[11] 4,109,242
[45] Aug. 22, 1978

[54] MATRIX ADDRESS SYSTEM USING ERASE OPERATION

[75] Inventor: Donald Jones Channin, Princeton, N.J.

[73] Assignee: RCA Corporation, New York, N.Y.

[21] Appl. No.: 758,995

[22] Filed: Jan. 13, 1977

[51] Int. Cl.² ............................................. G06F 3/14
[52] U.S. Cl. ............................... 340/324 M; 350/356
[58] Field of Search ............. 340/324 M, 336, 166 EL; 350/160 LC

[56] References Cited

U.S. PATENT DOCUMENTS

| | | | |
|---|---|---|---|
| 3,575,492 | 4/1971 | Nester | 350/160 LC |
| 3,575,493 | 4/1971 | Heilmeier | 350/160 LC |
| 3,906,451 | 9/1975 | Strom | 340/166 EL |
| 3,972,588 | 8/1976 | Adams et al. | 350/160 LC |
| 4,011,008 | 3/1977 | Gerritsma | 350/160 LC |

Primary Examiner—Marshall M. Curtis
Attorney, Agent, or Firm—H. Christoffersen; A. L. Limberg; L. P. Benjamin

[57] ABSTRACT

A multiplex addressing system for use with a multi-element array of liquid crystal electro-optic devices wherein all elements of a selected row are turned on by applying a predetermined activating voltage to all the elements of the row, then erasing the selected and non-selected elements in the row by a lesser and a greater amount to effect predetermined on and off responses, to take advantage of the highly non-linear erase response of the electro-optic devices.

11 Claims, 5 Drawing Figures

MATRIX ADDRESS SYSTEM USING ERASE OPERATION

BACKGROUND OF THE INVENTION

The present invention relates to displays comprising arrays of nematic liquid crystal devices and, in particular to a system for addressing such displays.

The optical response of liquid crystal devices results from changes in the direction of orientation of the liquid crystal molecules in response to electric fields created by an applied voltage. Nematic Liquid Crystal Devices (LCD) are generally of the commonly-termed Dynamic Scattering (DS), Electrically-Controlled Birefringence (ECB) also sometimes termed Distortion of Alligned Phases (DAP), and Twisted Nematic (TN) types. DS type LCD's generate an optical response by passing a current through the device or applying an electric field to the device to create a turbulence (randomness) in the molecular orientation of the nematic medium. In ECB type LCD's the nematic medium is situated between crossed-polarizers and an optical response is generated by applying an electric field to the device to uniformly rotate in a single plane, the orientation of the molecules from an initial uniform orientation with respect to the crossed-polarizers. The TN type LCD is similar to the ECB type LCD, except that the initial orientation of the molecules is not uniform but rather comprises relatively "twisted" layers of molecules and an application of an electric field is utilized to rotate the orientation of the molecules in two-dimensions. The brightness of the response in the ECB and TM type LC is a function of the angular rotation of the molecules.

Elements of the matrix display have typically been addressed by respectively applying signals of predetermined amplitude to the row and column of the matrix in which the selected element is located, such that the composite voltage across the selected element is equal to a predetermined voltage to cause thereby a predetermined optical response (brightness). It should be appreciated, that in order to obtain proper contrast between the selected elements and the other elements in the same rows or column as the selected element, the optical response of the elements to the addressing voltages must be highly non-linear. In addition, in applications where the matrix display is scanned, for example by activating all selected elements in each successive row at a fixed rate, it may be desirable that the decay rate from an activated (on) state to an inactivated (off) state be electrically controlled. One such device having a forced erased property is a field effect device having dielectric anisotropy reversal at high frequencies such as described in an article by Baur, Steib, and Meier appearing in *Applied Physics*, Volume 2, 1973, page 349 et seq. Another such device is a triode optical gate liquid crystal light valve (TOG) described in "Rapid Turn-off in Triode Optical Gate Liquid-Crystal Devices" by D. S. Channin and D. E. Carlson, appearing in *Applied Physics Letters*, Volume 28, No. 6, Mar. 15, 1976, pg. 300 et seq.

Various schemes have been proposed for obtaining maximum contrast and eliminating cross talk between selected and non-selected elements. For example, it has been proposed that an erase signal be applied to all non-selected elements concurrently with the application of exciting signals to the selected elements. Another prior art scheme is described in U.S. Pat. No. 3,955,187 issued May 4, 1976 to J. Bigelow. In the Bigelow system a first excitation signal is applied to a selected row and a second excitation signal is simultaneously applied to all columns. Those elements having both the first and second excitation signals applied to them are thereby activated. The Bigelow patent proposes achieving zero cross talk by maintaining constant the absolute magnitude of the second excitation signal, and attaining maximum contrast by proportioning the magnitudes of the first and second signals, in a ratio dependent upon the number of columns being addressed (in the active matrix). However, as will be hereinafter more fully explained, there are well-recognized limitations on practicable matrix size for given voltage magnitudes that obtain in the Bigelow system of addressing liquid crystal displays.

The present invention concerns an addressing system that relaxes the restrictions on matrix size for given contrast ratio requirements or improves contrast ratio for fixed matrix size. In the present addressing system a predetermined exciting voltage is applied to all the elements of a selected row, to initially excite the elements in that row. Then all selected elements in the row are erased by a first predetermined amount to generate a first predetermined optical information response in the selected elements, and the non-selected elements in the row are erased by a differing amount to generate a second predetermined optical information response in the non-selected elements. Thus, one is able to take advantage of the high non-linearity of the erase characteristics of the display elements to permit larger display size for given on-off contrast ratio, to better the on-off contrast ratio for given matrix size or to otherwise obtain a more advantageous trade-off of matrix size and contrast ratio.

Figure 1:
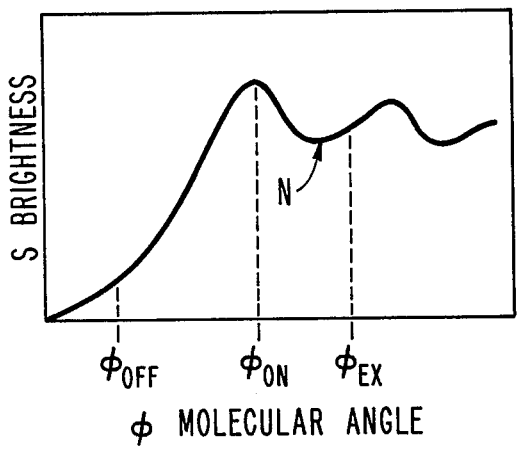
FIG. 1 is a graph of optical response brightness versus molecular rotation of an ECB liquid crystal device.

As noted above, an optical response in an electrically-controlled birefringence (ECB) type of liquid crystal device (LDC) is generated by application of an electric field to effect a uniform rotation by an amount $\phi$, of the orientation of the molecules from an initial uniform orientation ($\phi = 0$). The molecular rotation $\phi_{EX}$ in such an ECB LCD, in response to an excitation signal of amplitude $V_d$ for a duration $T_d$ may be expressed mathematically as follows.

$$\tan \phi_{EX} = \left( \frac{\tan \theta}{[1 + \tan^2\theta \exp(-K_d T_d V_d^2)]} \right) \quad (1)$$

$$[1 - \exp(-K_d T_d V_d^2)]$$

where $K_d$ is a constant determined by the LCD characteristics and device geometry and $\theta$ is the angle of orientation of the electric field in the LCD created by the excitation signal with respect to the orientation of the molecules in the off-state ($\phi = 0$). In instances where $\phi_{EX}$ is substantially less than $\theta$ and $\theta$ is relatively small, for example less than 60°, the excitation process may be described to good approximation by the following equation.

$$\phi_{EX} \simeq [\tan\theta/(1+\tan^2\theta)] K_d T_d V_d^2 \simeq K'_d T_d V_d^2 \quad (2)$$

Thus, the excitation response of the LCD is approximately proportional to the square of the excitation signal amplitude $V_d$.

The present inventor has noted, however, that the erase response of the LCD is exponentially related to the erase voltage. The erase response of an ECB LCD to an erase pulse of voltage $V_c$ and duration $T_c$ applied to the LCD after an excitation signal has oriented the molecules to $\phi_{EX}$ may be expressed as follows:

$$\tan \phi_{ER} = (\tan \phi_{EX}) \exp(-K_c T_c V_c^2) \quad (3)$$

where $K_c$ is a second constant determined by the LCD characteristics and geometry. In many cases for example at angles less than 40°, the tangent of an angle may be approximated by the angle itself, and when tangent $\phi_{ER}$ and tangent $\phi_{EX}$ may be so approximated, equation 3 simplifies to:

$$\phi_{ER} \approx (\tan \phi_{EX}) \exp(-K_c T_c V_c^2) \approx \phi_{EX} \exp(-K_c T_c V_c^2) \quad (4)$$

Thus, while the excitation response of the LCD is approximately dependent on $V_d$ in accordance with a square law, the erase response of the LCD is in accordance with an exponential function of $V_c$. $\phi_{EX}$ therefore may be expressed by the following Taylor series:

$$\phi_{EX} \alpha \exp(-K_c T_c V_c^2) = 1 - K_c T_c V_c^2 + \frac{1}{2}(K_c T_c V_c^2)^2 \quad (5)$$
$$- \frac{1}{6}(K_c T_c V_c^2)^3 + \ldots$$

Thus, where the quantity $K_c T_c V_c^2$ is much greater than 1, the erase response of the LC is much more non-linear than the excitation response, and accordingly, a more marked contrast between the on and off states can be achieved for a given voltage differential between selected and non-selected elements.

The relationship between molecular angle $\phi$ and optical response brightness S of an ECB LC is depicted graphically in FIG. 1. For a more detailed explanation of the relationship between molecular angle and brightness reference is made to "Introduction to Liquid Crystals", E. B. Priestley, P. J. Wojtowicz, P. Sheng, ed., Plenum Press, New York, 1975, Chapter 16. It should be noted, that maximum brightness occurs for a given molecular orientation, hereinafter termed $\phi_{on}$ and larger values of $\phi$ produce variable lesser brightnesses. The device is therefore, in effect, saturated in response to excitation voltages larger than that necessary to effect $\phi_{on}$. The maximum obtainable value of $\phi$ is determined by value of $\theta$, the angle of the electric field with respect to the initial orientation of the molecules and the crystals.

The present inventor noted that maximum contrast for the given differential voltage with minimum cross talk can be achieved as follows: (1) apply a signal of sufficient amplitude and duration to generate a $\phi_{EX}$ well above the value corresponding to maximum brightness; (2) then apply an erase pulse to the selected elements to bring their molecular orientation back to the range of $\phi_{on}$ for maximum optical brightness, while at the same time applying an erase pulse of differing amplitude, typically larger, to the non-selected elements to drive the molecular orientation to a state $\phi_{off}$ corresponding to a low brightness level. The amplitude of the erase pulse to the non-selected elements is typically higher than the amplitude of the erase signal to the selected elements to provide a $\phi_{off}$ corresponding to $\phi_{off}$ in FIG. 1. In some instances, however, it may be desirable that the response be erased from $\phi_{EX}$ by a relatively lesser amount to a $\phi_{off}$ which is located in a brightness "null" (N in FIG. 1), and by a relatively larger amount to a maximum brightness $\phi_{on}$. In other instances, for example where driving voltage amplitudes are limited, it may be desirable to use a $\phi_{on}$ not corresponding to maximum brightness, but brighter than the brightness level corresponding to $\phi_{off}$.

While the description herein relates particularly to ECB LCD's, a similar analysis can be made for any LCD having an erase characteristic more non-linear with respect to change in the signals effecting erasure, than the excitation characteristic is non-linear with respect to a change in the actuating signal, and a display of such elements may embody the present invention.

Figure 2:
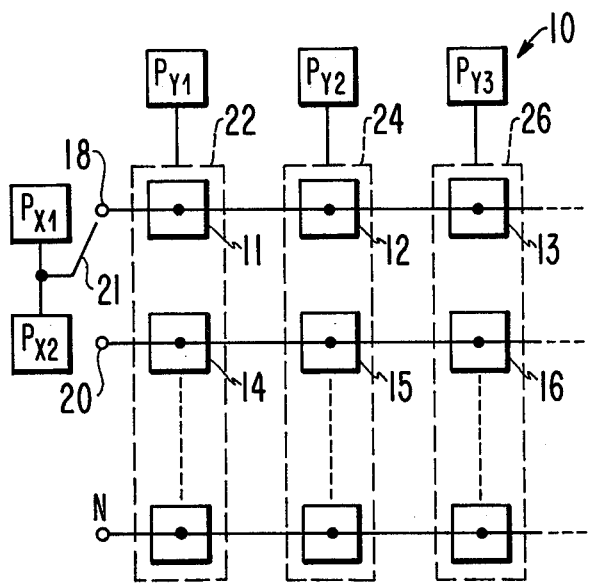
FIG. 2 is a block diagram of a matrix display embodying the present invention utilizing ECB liquid crystals with dielectric anisotropy reversal.
Figure 3:
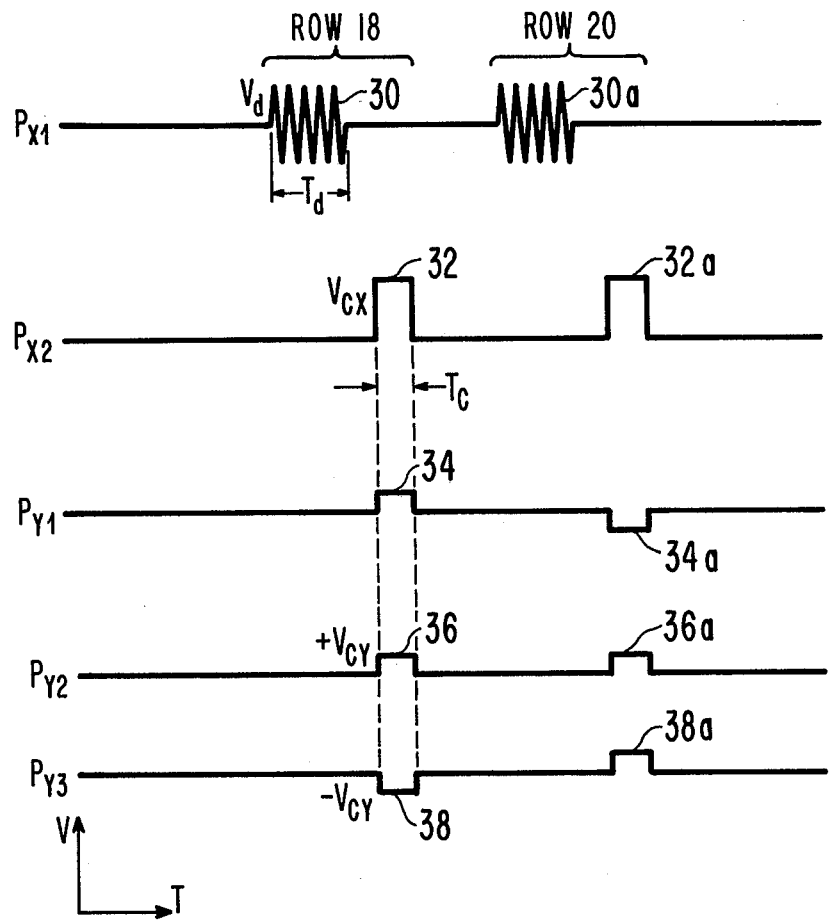
FIG. 3 shows the waveforms of various signals associated with the display matrix of FIG. 2.

Referring now to FIGS. 2 and 3, a matrix display 10 embodying the present invention utilizing ECB LCD's having a positive dielectric anisotrophy at low frequencies and a negative dielectric anisotropy at high frequencies will be described. In such LCD's the nematic molecules align in parallel with the direction of low frequency electric fields and perpendicular to high frequency electric fields. In the following discussion it is assumed that the cross polarizers and field orientations are such that high frequency signals activate the device and low frequency signals cause erasure.

Display 10 comprises a plurality of such ECB LCD's 11–16. LCD's 11–16 respectively include first and second electrodes. The respective first electrodes of predetermined groups of LCD's such as the group including LC's 11, 12 and 13, and the group including LC's 14, 15 and 16, are respectively connected in common to electrically conductive leads to form rows 18 and 20, respectively. Similarly, the respective second electrodes of preselected groups of LCD's, such as the groups respectively including, LCD's 11 and 14, LCD's 12 and 15 and LCD's 13 and 16, are connected in common to electrically conductive leads to form columns 22, 24 and 26. Each of the columns 22, 24, 26 is coupled to a respective conventional pulse generator, generally indicated as $P_{y1}$, $P_{y2}$ and $P_{y3}$. A further pair of pulse generators $P_{x1}$, $P_{x2}$ is connected via a switch 21 to a selected one of the rows 18 or 20, connection to row 18 being shown.

The pulse generators supply signals to address the elements of display 10 as will be explained with reference to FIG. 3. Pulse generator $P_{x1}$ supplies a burst (pulse) 30 for duration $T_d$ of high frequency excitation signal of amplitude $V_d$. Subsequent to the generation of excitation pulse 30, pulse generator $P_{x2}$ supplies a low frequency erase pulse 32 of amplitude $V_{cx}$ and duration $T_c$. Pulse generators $P_{y1}$, $P_{y2}$, $P_{y3}$ supply further erase pulses 34, 36 and 38, occurring simultaneously with erase pulse 32 and preferably all of magnitude $V_{cy}$, as will be explained.

The information to be displayed in the selected row (e.g. 18) is represented by the sum of the magnitudes of the erase voltages applied to the respective elements, here determined by the polarity of erase pulses 34, 36 and 38. The voltage applied across a particular element is equal to the difference between the voltages applied at its respective first and second terminals. Voltage magnitudes $V_d$, $V_{cx}$ and $V_{cy}$ and durations $T_d$ and $T_c$ are therefore chosen such that:

1. $V_d$ generates, in accordance with equation 2, a molecular rotation corresponding to $\phi_{EX}$ in FIG. 1; and
2. $V_c = V_{cx} - V_{cy}$ and $V_c = V_{cx} + V_{cy}$ respectively erase the LCD response, in accordance with equation 3, to molecular angles corresponding to $\phi_{on}$ and $\phi_{off}$ in FIG. 1. Thus, $$\phi_{on} = (\tan \phi_{EX}) \exp[-K_c T_c (V_{cx} + V_{cy})^2] \tag{6}$$

$$\phi_{off} = (\tan \phi_{EX}) \exp[-K_c T_c (V_{cx} - V_{cy})^2] \tag{7}$$

The generic response $\phi_1$ of any given element may therefore be expressed:

$$\phi_1 = (\tan \phi_{EX}) \exp[-K_c T_c (V_{cx} \pm V_{cy})^2] \tag{8}$$

FIG. 3 depicts pulses 34, 36 and 38 for the situation where LCD's 11 and 12 are "on" and LCD 13 is off in row 18. Pulses 34 and 36 applied to columns 22 and 24 are of positive amplitude. The voltages across LCD's 11 and 12 thus are equal to $V_{cx} - V_{cy}$, $\phi = \phi_{on}$ and LCD's 11 and 12 generate a maximum brightness response. Pulse 38 applied to column 26 however is of negative amplitude. The voltage across LCD 13 is therefore equal to $V_{cx} + V_{cy}$, $\phi = \phi_{off}$ and LCD 13 is erased to an off response. It should be appreciated, that while pulses 34, 36 and 38, are also respectively applied to LCD's 14–16, no burst of excitation frequency is applied to row 20.

In a scanning operation, after the addressing of row 18, pulse sources $P_{x1}$ and $P_{x2}$ are selectively connected to row 20, to apply an excitation pulse 30a followed by an erase pulse 32a. Pulse sources $P_{y1}$, $P_{y2}$ and $P_{y3}$ generate in synchronism with pulse 32a erase pulses 34a, 36a and 38a. In the example depicted in FIG. 3, pulse 34a is of negative polarity and pulses 36a and 38a are respectively of positive polarity to provide bright responses in LCD's 15 and 16 and an off response in LCD 14.

Addressing of subsequent rows affects the response elements in previously activated rows. For example, pulses 32a, 34a, 36a and 38a are also applied to the second terminals of LCD's 11–13. Such erase voltages cause the molecular angles of LCD's 11–13 to change from their instantaneous values, generically represented by $\phi_1$ ($\phi_{on}$ or $\phi_{off}$), to an angle $\phi_2$ in accordance with the following equation $$\phi_2 = \phi_1 \exp(-K_c T_c V_{cy}^2) \tag{9}$$

The addressing of additional rows in display 10 (not shown) affects the response of the LCD's in row 18 in a similar manner. It can be shown that the addressing of N rows will cause the response of LCD's in row 18 to change to a molecular angle $\phi_N$ in accordance with equation 10.

$$\phi_N = \phi_1 \exp[-(N-1)K_c T_c V_{cy}^2] \tag{10}$$

Substituting equation (8) for $\phi_1$, equation (10) becomes:

$$\phi_n = (\tan \phi_{EX})[\exp(-K_c T_c V_{cx}^2)] \tag{11}$$

$$[\exp(-2K_c T_c(\pm V_{cx} V_{cy}))]$$

$$[\exp(-NK_c T_c V_{cy}^2)]$$

Thus, the effect of addressing a multiplicity of rows in series is to erase the previous response by a cumulative factor $\Delta$;

$$\Delta = \exp[-(N-1) K_c T_c V_{cy}^2] \tag{12}$$

To maintain an adequately bright displayed response, the cumulative erasure on the response of the elements must not become too great. For example, in a typical display $\phi_N$ generally should not become smaller than $0.37 \phi_1 = \phi_1/\epsilon$. That is:

$$\phi_N \geq e^{-1}\phi_1 \tag{13}$$

To maintain such a criteria, $V_{cy}$, should be chosen in accordance with the following equation 14.

$$V_{cy} = [(N-1)K_c T_c]^{-\frac{1}{2}} \tag{14}$$

Further, $V_{cx}$ is constrained by the extent that it is possible to drive the liquid crystal response past the molecular rotation corresponding to full optical response. Equations (6) and (14) are combined algebraically, and for greater accuracy and consistency $\phi_{on}$ is replaced with $\tan \phi_{on}$, to give the following equation:

$$V_{cx} = \left\{ \frac{\left[\ln\left(\frac{\tan \phi_{EX}}{\tan \phi_{on}}\right)\right]}{K_c T_c} \right\}^{-\frac{1}{2}} + [(N-1)K_c T_c]^{-\frac{1}{2}} \tag{15}$$

Accordingly, the ratio between $V_{cx}$ and $V_{cy}$ may be expressed:

$$V_{cx}/V_{cy} = [1 + (N-1) \ln (\tan \phi_{EX}/\tan \phi_{on})] \tag{16}$$

The on-off state contrast is thus in accordance with the ratio determined algebraically from equations 6, 7, 14, 15 to be $$\frac{\phi_{on}}{\phi_{off}} = \exp(4K_c T_c V_x V_y) \tag{17}$$

$$= \exp\left\{ \frac{4\left[1 + (N-1)^{\frac{1}{2}}\left(\ln\left(\frac{\tan \phi_{EX}}{\tan \phi_{on}}\right)\right)\right]}{(N-1)} \right\}$$

By way of comparison, a similar analysis of a system such as described in the above-mentioned U.S. Pat. No. 3,559,187 to Bigelow shows the ratios for the Bigelow system may be expressed:

$$\phi_{on}/\phi_{off} = [(1+\sqrt{N})^2 + N - 1]/[(1-\sqrt{N})^2 + N - 1] \tag{18}$$

$$V_{cx}/V_{cy} = \sqrt{N} \tag{19}$$

The significance of the difference between the contrast ratio of the Bigelow system and the present invention may best be explained by reference to a specific instance. In displays using birefringence devices, it is often desirable that the on-off contrast ratio, $\phi_{on}/\phi_{off}$ be equal to 2. A display having such contrast ratio utilizing direct activation addressing such as described in the Bigelow patent is limited to nine rows, i.e. $n = 9$. On the other hand, a contrast ratio of 2 in a matrix of typical ECB LC's having typical values of $\phi_{EX}$ and $\phi_{on}$ ($\phi_{EX}=50°$ and $\phi_{on}=30°$), utilizing erase addressing in accordance with the present invention, $N=35.7$, providing for multiplexing of at least 35 rows. It should be appreciated, that the number of rows that can be multiplexed while maintaining a given contrast in an erase addressing system is directly dependent on the difference in values between $\phi_{EX}$ and $\phi_{on}$. For example, where $\phi_{EX}$ is 50° and $\phi_{on}$ is 40°, N equals 22.7. Similarly, if $\phi_{EX}$ is 50° and $\phi_{on}$ is 49°, N equals 10.

Reversing anisotropy ECB LCD's have relatively slow reaction time and relatively limited operating temperature ranges. A faster display may be attained by utilizing triode optical gate (TOG) LC devices, such as described in U.S. Pat. No. 3,981,559 issued Sept. 21, 1976 to the present inventor with reference to FIG. 13 of that patent. Briefly, in a TOG device nematic layer of positive dielectric anisotropy is sandwiched between a planar electrode, typically transparent, on one side and two interdigitated electrodes on the other side. The TOG device is activated by a voltage differential between the interdigitated electrodes. A voltage difference between the interdigitated electrode surface and the planar electrode, when the interdigitated electrodes are at equal potential, operates to erase the liquid crystal response in accordance with the magnitude of the difference.

Figure 4:
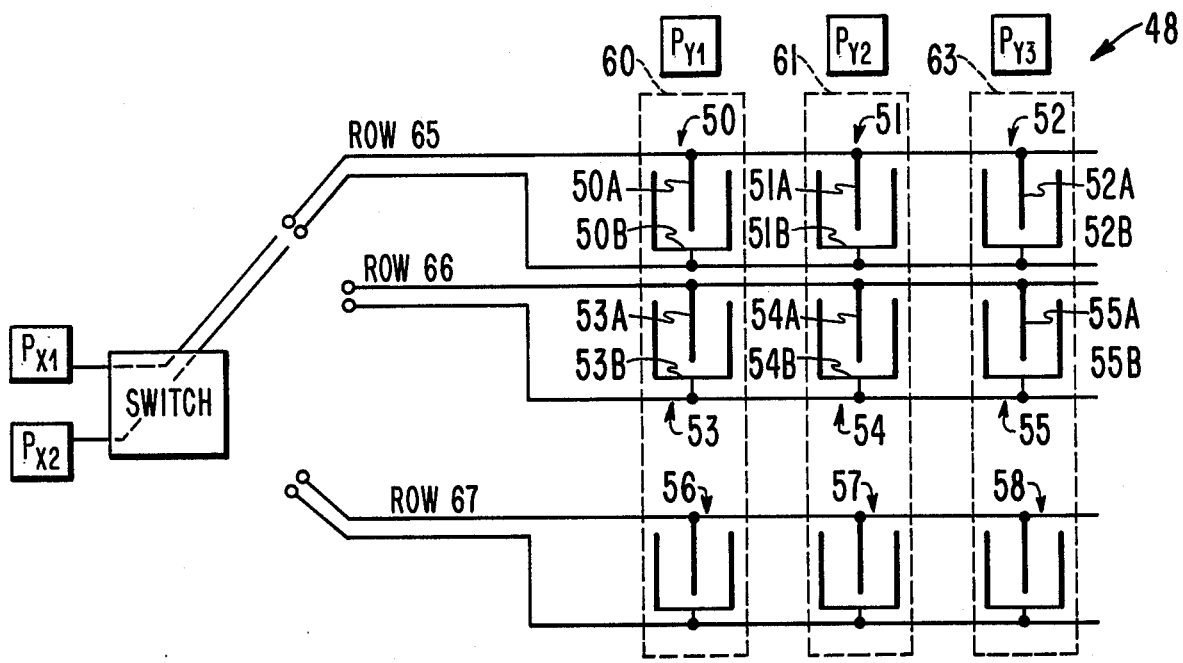
FIG. 4 is a display matrix embodying the present invention utilizing TOG liquid crystal devices.

A matrix 48 of TOG devices 50–58 is shown in FIG. 4. The respective planar electrodes of groups of the TOGs are connected to form columns 60–62. The respective interdigitated electrodes are denoted in FIG. 4 by the reference number of the associated TOG followed by an "A" or "B" to indicate the specific electrode. The A & B interdigitated electrodes of groups of TOGS (50–52, 53–55, 56–58) are respectively electrically connected to common nodes to form rows 65–67. For a more detailed description of such a matrix structure reference is made to the above-mentioned U.S. Pat. No. 3,981,559. Pulse sources $P_{y1}$, $P_{y2}$ and $P_{y3}$ are respectively connected to columns 60–62. Pulse sources $P_{x1}$ and $P_{x2}$ are selectively connected to the common connections of the A and B interdigitated electrodes of the TOGS of a given row, such as row 65, by, for example a double pole rotary switch 68.

Figure 5:
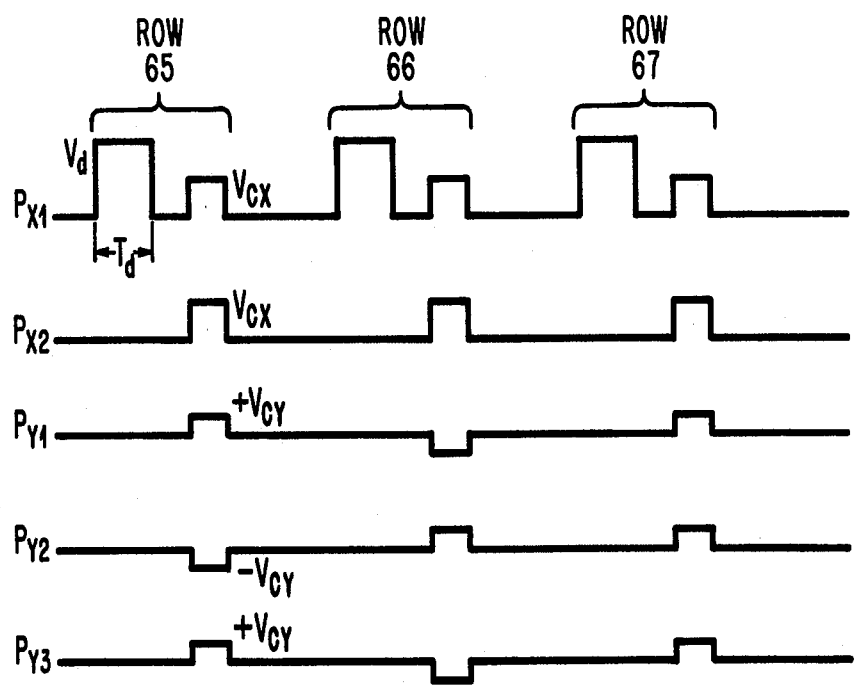
FIG. 5 shows the waveforms of various signals associated with the matrix display of FIG. 4.

After selecting a given row for addressing by switch 68, pulse sources $P_{x1}$ and $P_{x2}$ apply a voltage differential between the A and B interdigitated electrodes of the TOGS in that row, by, for example, applying a voltage pulse of amplitude $V_d$ and duration $T_d$ to the A electrodes and grounding the B electrodes. After the activating pulse, pulse sources $P_{x1}$ and $P_{x2}$ apply pulses of equal magnitude and polarity to both the A and B interdigitated electrodes of the TOGS in the row. Simultaneously, pulse sources $P_{y1}$, $P_{y2}$ and $P_{y3}$ apply pulses of a predetermined amplitude $V_{cy}$ to the respective columns 60–63. Such pulses are of positive or negative polarity in accordance with whether the particular TOG is selected or non-selected. Thus, after effecting an initial activation, the A and B interdigitated electrodes are brought to equal potential to permit an erasure, and pulse sources $P_{y1}$, $P_{y2}$ and $P_{y3}$ create a greater or lesser difference in potential between the interdigitated and planar electrodes to effect greater or lesser erasure of the elements. The pulse waveforms produced by $P_{x1}$, $P_{x2}$, $P_{y1}$, $P_{y2}$ and $P_{y3}$ for "sequential row erase addressing", as described above, of TOGS 50 and 52 in row 65, 54 in row 66, and 56–58 in row 67 are illustrated in FIG. 5.

The above analysis of the display described with reference to FIGS. 2 and 3 are also applicable to the display described with reference to FIGS. 4 and 5.

It should be appreciated, that erase addressing embodying the present invention can be accomplished by applying pulses of differing magnitudes to the columns rather than, or in addition to, differences in polarity. Further, while switches 21 of FIG. 2 and 68 of FIG. 4 are shown as mechanical switches, such switches are in practice typically electronic switches formed of transistors, diodes or the like. (It should also be appreciated that while pulse sources $P_{y1}$, $P_{y2}$, $P_{y3}$ and $P_{x1}$, $P_{x2}$ are shown as separate units, in practice such pulse sources would typically be combined in a relatively small number of integrated circuits, coupled to the display at the ends of the rows and columns.)

What is claimed is:

1. In a display device of the type including a plurality of liquid crystal electro-optical elements interconnected into rows and columns and addressing means for generating a first predetermined optical information response in selected ones of said elements in a selected row, and a second predetermined optical information response in non-selected elements of said selected row,
    said elements being excited in accordance with a predetermined excitation characteristic in response to excitation signals applied thereto and being erased in accordance with a predetermined erase characteristic in response to erase signals applied thereto, the improvement wherein
    said elements are of a type having an erase characteristic that is non-linear with respect to changes in applied erase signals; and
    said addressing means comprises:
    means for applying an initial excitation signal to all elements in said selected row to generate in said elements an initial excitation response;
    means for applying, subsequent to the application of said initial excitation signal to said selected row, a first erase signal to said selected elements and a second erase signal to said said elements, and first erase signal effecting in said selected elements said first predetermined optical information response and said second erase signal effecting a differing amount of erasure than said first erase signal to generate in said non-selected elements said second predetermined optical information response.

2. The display of claim 1 wherein said liquid crystal electro-optical elements are of the type having an optical response that is related to the angular deviation of the orientation of the molecules of a nematic medium with respect to an initial molecular orientation, said angular deviation increasing in accordance with said excitation characteristic in response to said excitation signals and decreasing in accordance with said erase characteristic in response to said erase signals; and wherein
    said initial excitation signal generates an angular deviation $\phi_{EX}$ corresponding to said initial excitation response, and said first and second erase signals decrease said angular deviation from $\phi_{EX}$ by respective amounts to effect respectively, anular deviations $\phi_{on}$ corresponding to said first optical information response and $\phi_{off}$ corresponding to said second optical information response.

3. The display of claim 2 wherein said display is of N rows of elements, and the ratio of said first and second angular deviations, $\phi_{on}/\phi_{off}$ is approximately equal to $$\exp\left\{\frac{4}{(N-1)}\left[1+\sqrt{(N-1)\ln\left(\frac{\tan\phi_{EX}}{\tan\phi_{on}}\right)}\right]\right\}.$$

4. The display of claim 2 wherein said electro-optical elements are electrically-controlled birefringence liquid crystal devices.

5. The display of claim 4 wherein said molecular orientation tends to align in a first direction in response to electric fields of a first frequency and align in a second direction substantially orthogonal to said first direction in response to electric fields of a second frequency, and wherein further:

said means for applying said initial excitation signal comprises means for producing, for a first predetermined period, in each of the elements of the selected row, an electric field of first predetermined amplitude of said first frequency; and said means for applying said first and second erase signals comprises means for producing, for a second predetermined period subsequent to said first period, in said selected elements an electric field of a second predetermined amplitude of said second frequency and producing in said non-selected elements during said second period an electric field of a third predetermined amplitude of said second frequency.

6. The display of claim 5 wherein said third amplitude is greater than said second amplitude.

7. The display of claim 2 wherein each said electro-optical element is of the type wherein said nematic medium is situated between a planar electrode and a set of interdigitated electrodes, and wherein further:

said means for applying said initial excitation signal comprises means for applying a signal to said interdigitated electrodes of each element in the selected row to generate a first potential difference between said interdigitated electrodes to generate thereby said initial excitation response; and said means for applying said erase signals comprises:

means for applying a signal to said interdigitated electrodes of each element in the selected row to bring each of said interdigitated electrode to a predetermined potential;

means for applying said first erase signal to the planar electrode of each said selected element to generate a second potential difference between its interdigitated and planar electrodes whereby said first predetermined optical information response obtains from each said selected element, and means for applying said second erase signals to the planar electrode of each said non-selected elements to generate a third potential difference between its interdigitated and planar electrodes whereby said second predetermined optical information response obtains from each said non-selected element.

8. The display of claim 7, wherein said elements are triode optical gate liquid crystal devices.

9. The display of claim 2 wherein said means for applying said first and second erase signals comprises:

means for simultaneously applying a first portion of said first erase signal to each column containing a selected element and a first portion of said second erase signal to each column not containing a selected element, and means for applying second portions of said first and second erase signals to each of the elements in said selected row.

10. The display of claim 9 wherein said means for applying said erase signal first portions comprise:

means for generating as said first erase signal first portion a voltage pulse of first predetermined amplitude, $V_{cy}$, and of first predetermined polarity;

means for generating as said second erase signal first portion a voltage pulse of said first predetermined amplitude, $V_{cy}$, and opposite polarity to said first polarity; and said means for generating said second erase signal portions comprise means for generating voltage pulses of a second predetermined amplitude, $V_{cx}$, and said first polarity.

11. The display of claim 10 wherein
said display has N rows of elements,
said elements have an erase characteristic constant $K_c$, and said erase signal voltage pulses are of width $T_c$, wherein further:

said first predetermined amplitude $V_{cy}$ is approximately equal to $1/(\sqrt{(N-1)\,K_c\,T_c})$; and said second predetermined amplitude $V_{cx}$ is approximately equal to $$\sqrt{\frac{1}{K_c T_c} \ln \frac{\tan \phi_{Ex}}{\tan \phi_{on}}} + \frac{1}{\sqrt{(N-1)K_c T_c}}.$$

* * * * *

UNITED STATES PATENT AND TRADEMARK OFFICE
CERTIFICATE OF CORRECTION

PATENT NO. 4,109,242

DATED : August 22, 1978

INVENTOR(S) : Donald Jones Channin

It is certified that error appears in the above-identified patent and that said Letters Patent is hereby corrected as shown below:

Column 4, line 26, "anisotrophy" should be --anisotropy--.

Column 8, line 41, "said said" should be --said non-selected--.

Column 8, line 62, "anular" should be --angular--.

Signed and Sealed this

Tenth Day of April 1979

[SEAL]

Attest:

RUTH C. MASON
Attesting Officer

DONALD W. BANNER
Commissioner of Patents and Trademarks